(12) United States Patent
Poirier et al.

(10) Patent No.: US 7,152,553 B2
(45) Date of Patent: Dec. 26, 2006

(54) REMOVABLE BIRD CAGE CANTINA

(76) Inventors: Michel Poirier, 615, De l'Envolee, #4, Mascouche, Quebec (CA) J7K3X5; Denis Desnoyers, 1257, Coursol, Repentigny, Quebec (CA) J5Y3N9

( * ) Notice: Subject to any disclaimer, the term of this patent is extended or adjusted under 35 U.S.C. 154(b) by 0 days.

(21) Appl. No.: 11/045,753

(22) Filed: May 24, 2005

(65) Prior Publication Data
US 2006/0137618 A1    Jun. 29, 2006

(30) Foreign Application Priority Data
Nov. 17, 2004    (CA) .................................... 2485925

(51) Int. Cl.
*A01K 5/00* (2006.01)
(52) U.S. Cl. .................. 119/464; 119/429; 119/477; 119/462
(58) Field of Classification Search ............... 119/464, 119/428, 429, 459, 460, 454, 462, 431, 432, 119/465, 467, 475, 477, 482, 51.01, 72, 472, 119/485, 478, 484, 165, 57.8, 61.57
See application file for complete search history.

(56) References Cited

U.S. PATENT DOCUMENTS

| | | | | |
|---|---|---|---|---|
| 2,031,874 | A * | 2/1936 | Bulter et al. | 119/464 |
| 3,415,226 | A * | 12/1968 | Cheung | 119/464 |
| 3,641,983 | A * | 2/1972 | Keen et al. | 119/480 |
| 3,654,904 | A * | 4/1972 | Krueger | 119/469 |
| 3,712,267 | A * | 1/1973 | Moliterni | 119/464 |
| 4,235,196 | A * | 11/1980 | Moliterni | 119/464 |
| 4,981,109 | A * | 1/1991 | Vaught | 119/61.5 |
| 5,134,970 | A * | 8/1992 | Oh | 119/428 |
| 5,165,366 | A * | 11/1992 | Harvey | 119/165 |
| 5,361,725 | A * | 11/1994 | Baillie et al. | 119/165 |
| 5,771,838 | A * | 6/1998 | Bloom et al. | 119/52.2 |
| 6,237,534 | B1 * | 5/2001 | Schwartz | 119/165 |
| 6,516,750 | B1 * | 2/2003 | Heinzeroth | 119/428 |
| 6,659,045 | B1 * | 12/2003 | Thompson | 119/482 |
| 2004/0144330 | A1 * | 7/2004 | Marchioro | 119/477 |

* cited by examiner

*Primary Examiner*—Yvonne R. Abbott

(57) ABSTRACT

A removable bird cage cantina is an adjunct to an existing bird cage, is removable and serves as a place where birds feed. It is comprised of a body and at least one niche but preferably two or more, removably attached, generally on a wall of the body.

2 Claims, 7 Drawing Sheets

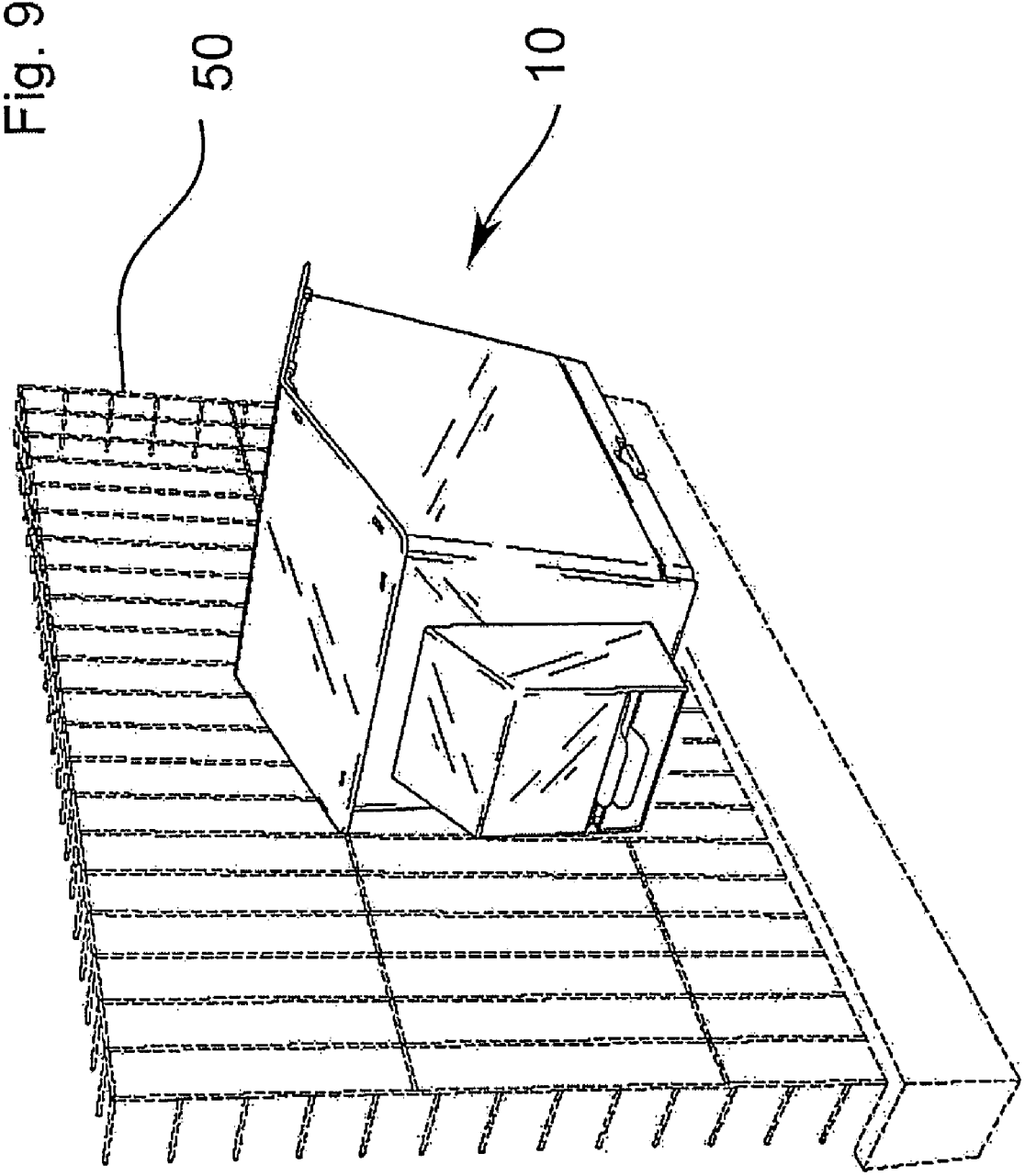

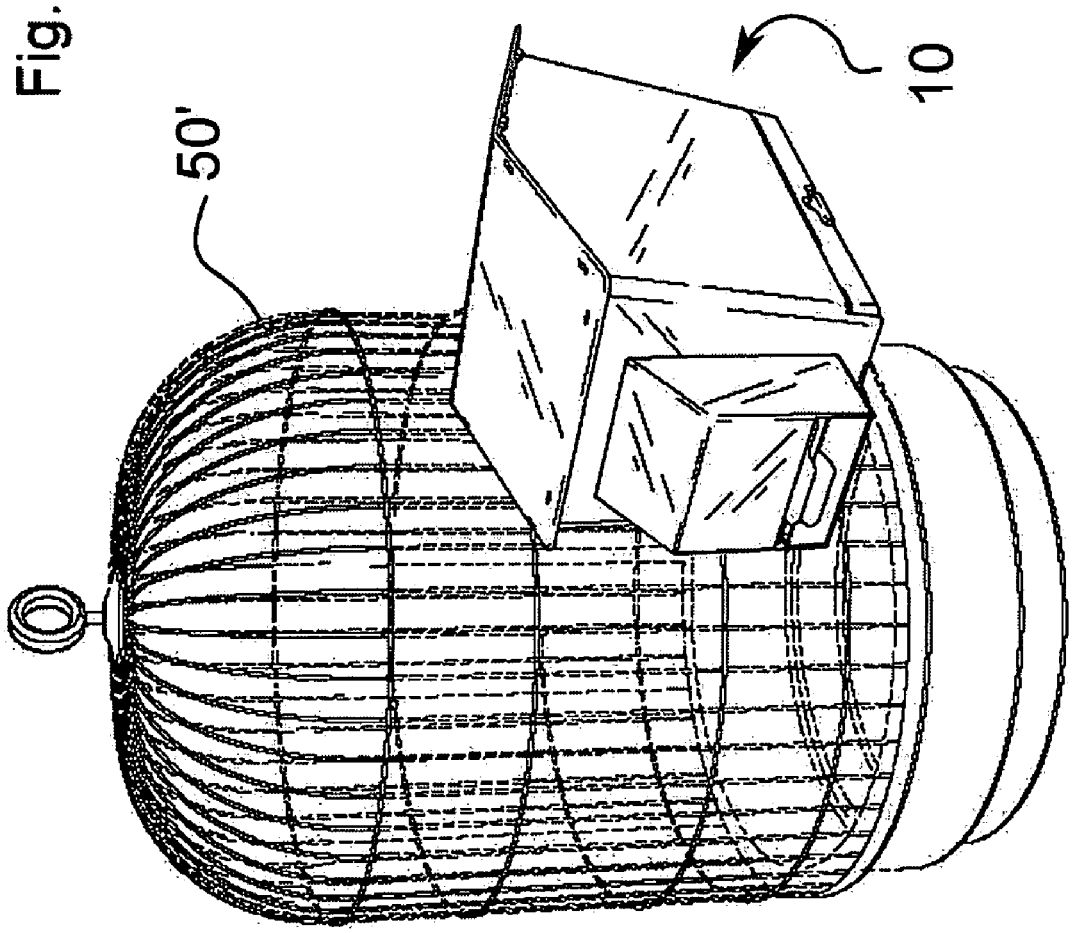

REMOVABLE BIRD CAGE CANTINA

Figure 1:
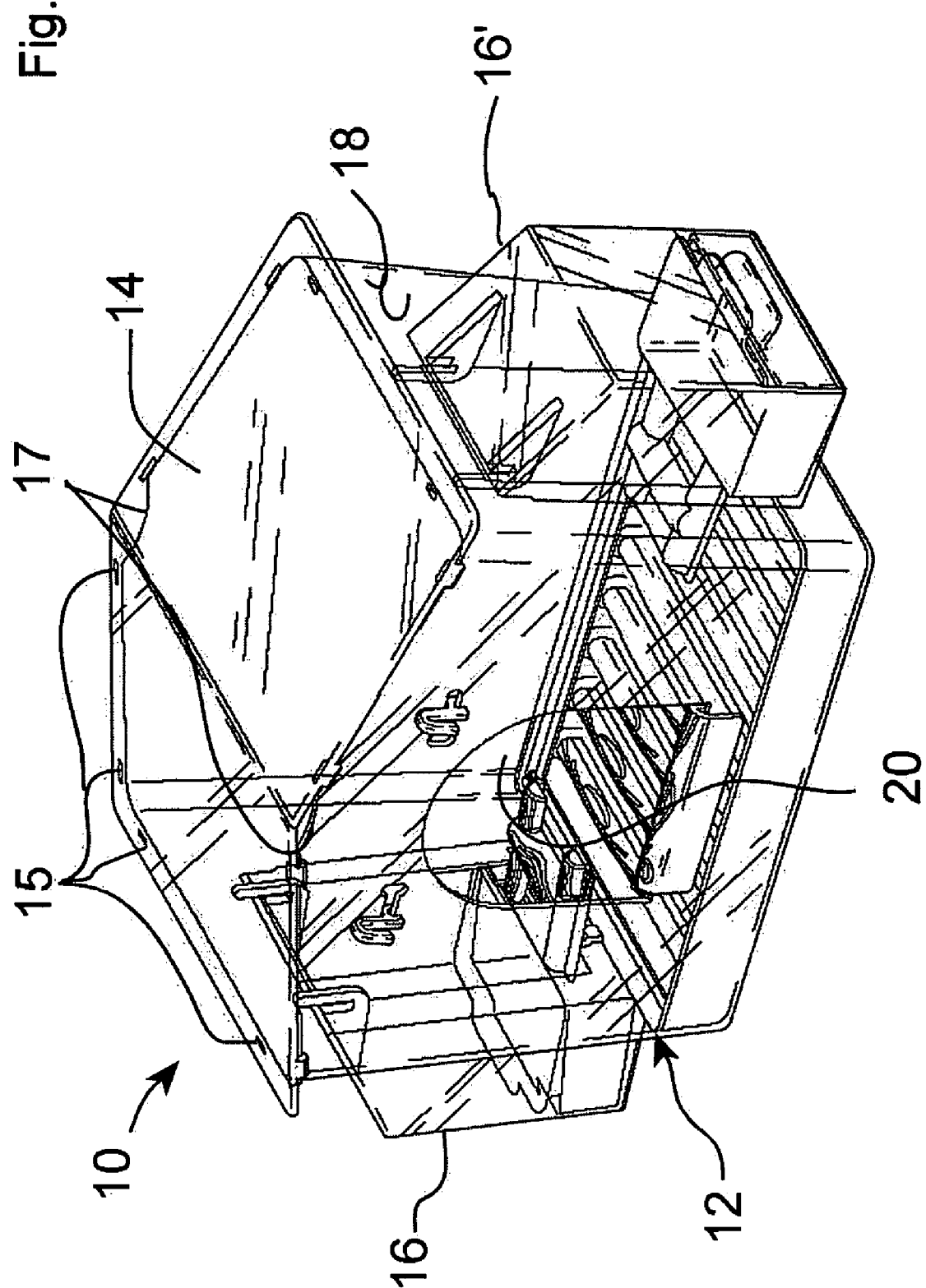

This application claims priority based on canadian application 2,485,925 filed Nov. 17, 2004.

BACKGROUND OF THE INVENTION

1. Field of the Invention

The invention relates generally to bird cages but more particularly to an adjunct, removable element which serves as a place where birds feed.

2. Background of the Invention

The prior art shows many small feeders for birds. These feeders are generally hooked outside or inside a bird cage and provide a bird with water, feed or both.

When cleaning of the cage is required, it is sometimes a problem to deal with the birds as they have to be temporarily relocated in a temporary container.

Recently, some birdcages have introduced sections, generally the corners, having transparent plastic panels where the feeders are also located. This has the advantage of minimizing the amount of bird feed thrown outside the bars of the cage when birds move around, flapping their wings. What it does not do, however, is reduce the amount of food being carried inside the cage itself.

SUMMARY OF THE INVENTION

In view of the foregoing disadvantages inherent in the known devices now present in the prior art, the present invention, which will be described subsequently in greater detail, is to provide objects and advantages which are:

Firstly to provide for a separate feeding section for birds adjoining a cage.

It is a second object of this invention to provide a separate feeding section which is removable from the cage.

It is a third object of this invention to provide for a separate feeding section which serves as a temporary cage for birds when cleaning the main cage.

It is a fourth object of this invention to provide for an adjunct cage large enough for one or more birds to fully enter into the adjunct cage.

It is a fifth object of this invention to provide for a body with a smooth surface such as synthetic resisns, or any material exhibiting similar properties, which is easy to clean.

It is a sixth object of this invention to provide for a body with a smooth surface such as synthetic resisns, or any material exhibiting similar properties, which is impenetrable to bird feed or similar particles.

It is a seventh object of this invention to provide for a feeding area with a fully closed environment of clear plexiglas, or any material exhibiting similar properties, that totally eliminates the problem of projected feed particles, a problem only partially solved by some recent bird cages offering corners of plexiglas, or any such material.

To attain these ends, the present invention generally comprises a removable feeding area for small pets which is configured and shaped to fit in front of an existing bird cage door so as to use that door for it is important to allow for one or more birds to be able to move around freely when in a feeding mode, that is why the prior art is inadequate.

Other advantages such as niche feeders with removable food trays for easy replenishing; slide out floor for easy cleaning; removable doorway perch for easy cleaning; openable roof for easy fetching of bird such as when bringing the feeding area with the birds over to the veterinarian—all are provided by this invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE PREFERRED EMBODIMENT

FIG. 1 Perspective view of the removable feeding area favoring the front.

Figure 2:
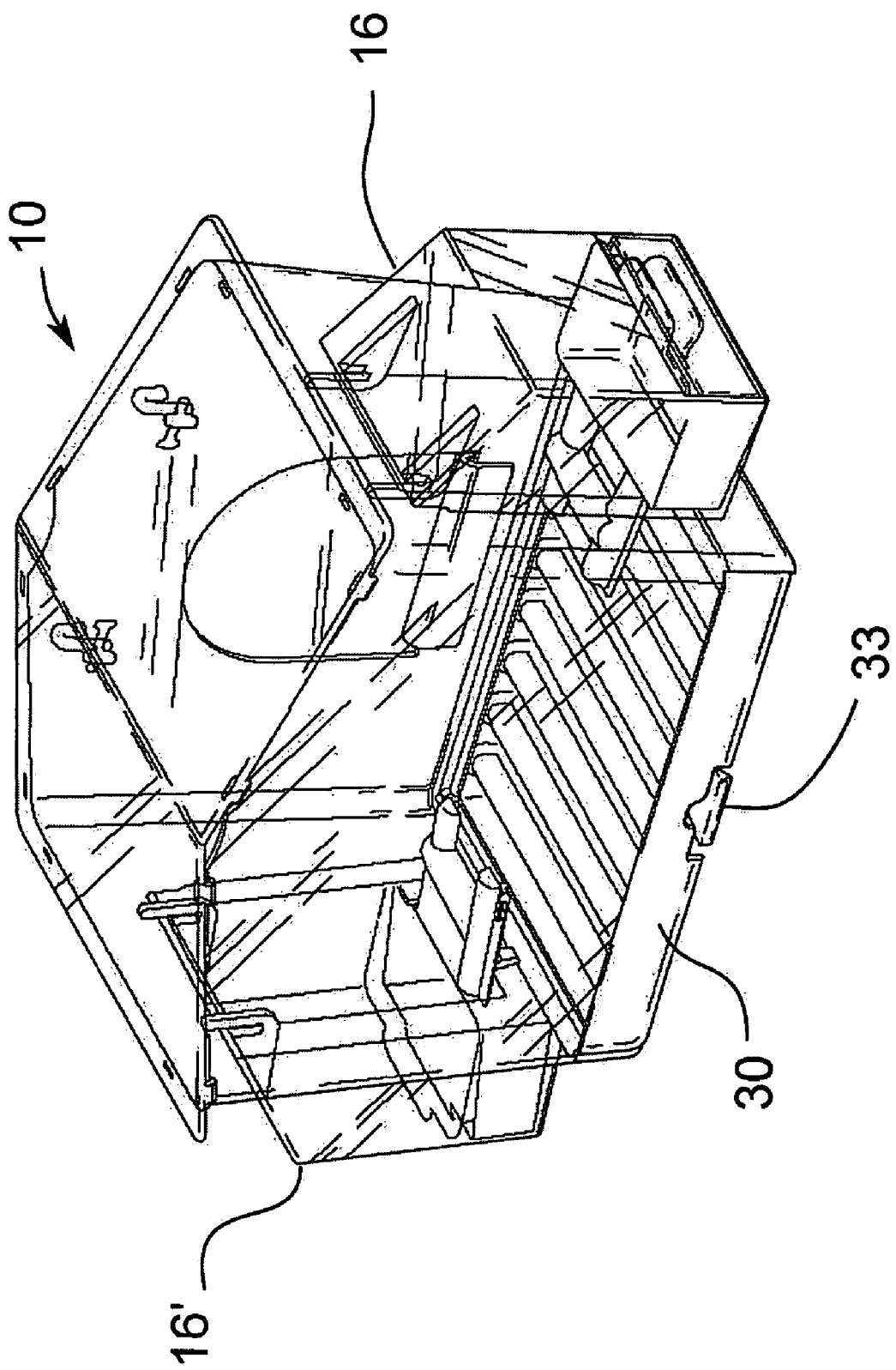

FIG. 2 Perspective view of the removable feeding area favoring the back.

Figure 3:
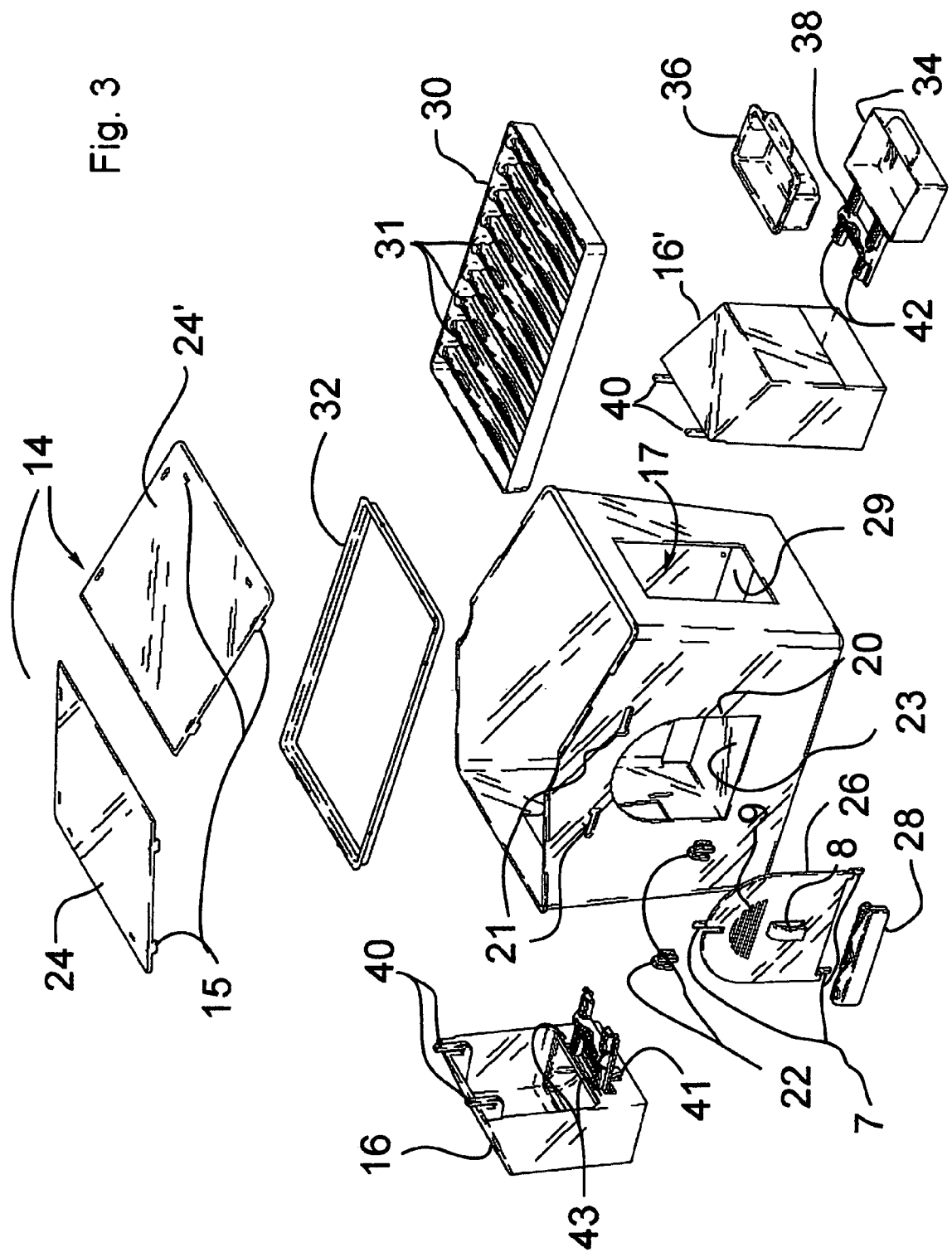

FIG. 3 Exploded perspective view of the removable feeding area.

Figure 4:
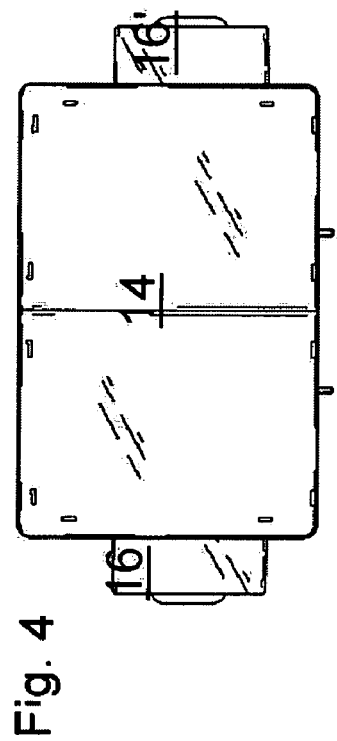

FIG. 4 Top view of the removable feeding area.

Figure 5:
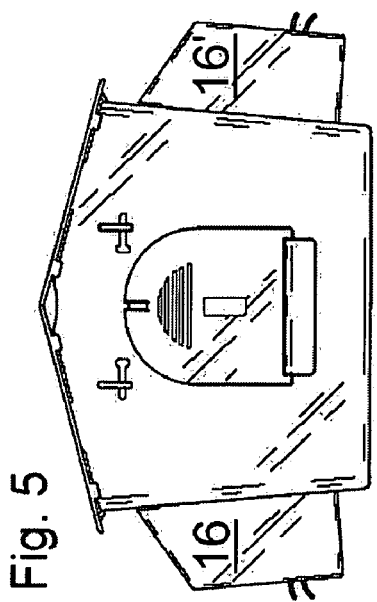

FIG. 5 Front view of the removable feeding area.

Figure 6:
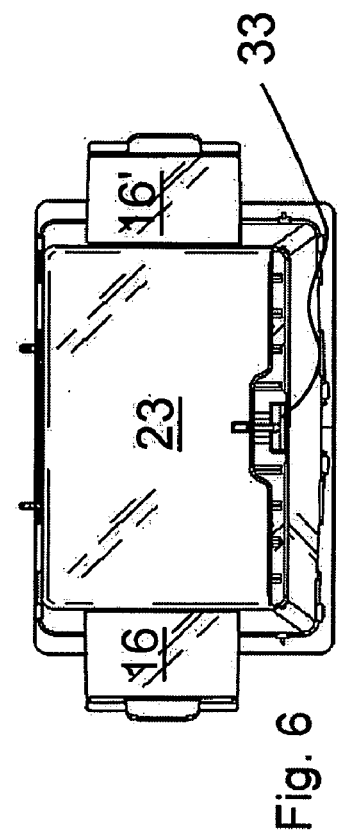

FIG. 6 Left side view of the removable feeding area.

Figure 7:
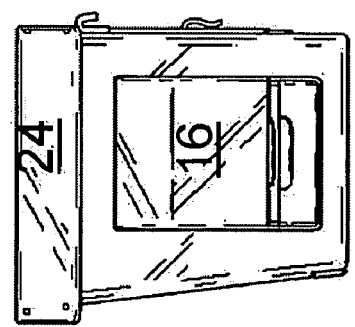

FIG. 7 Right side view of the removable feeding area.

Figure 8:
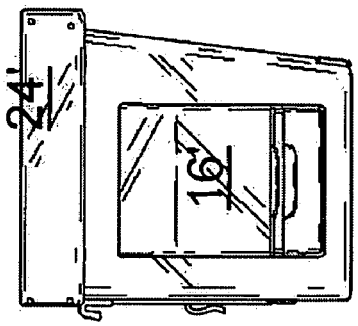

FIG. 8 Bottom view of the removable feeding area.

FIG. 9 Perspective view of the removable feeding area favoring the back when hung from a rectangular cage.

Figure 10:
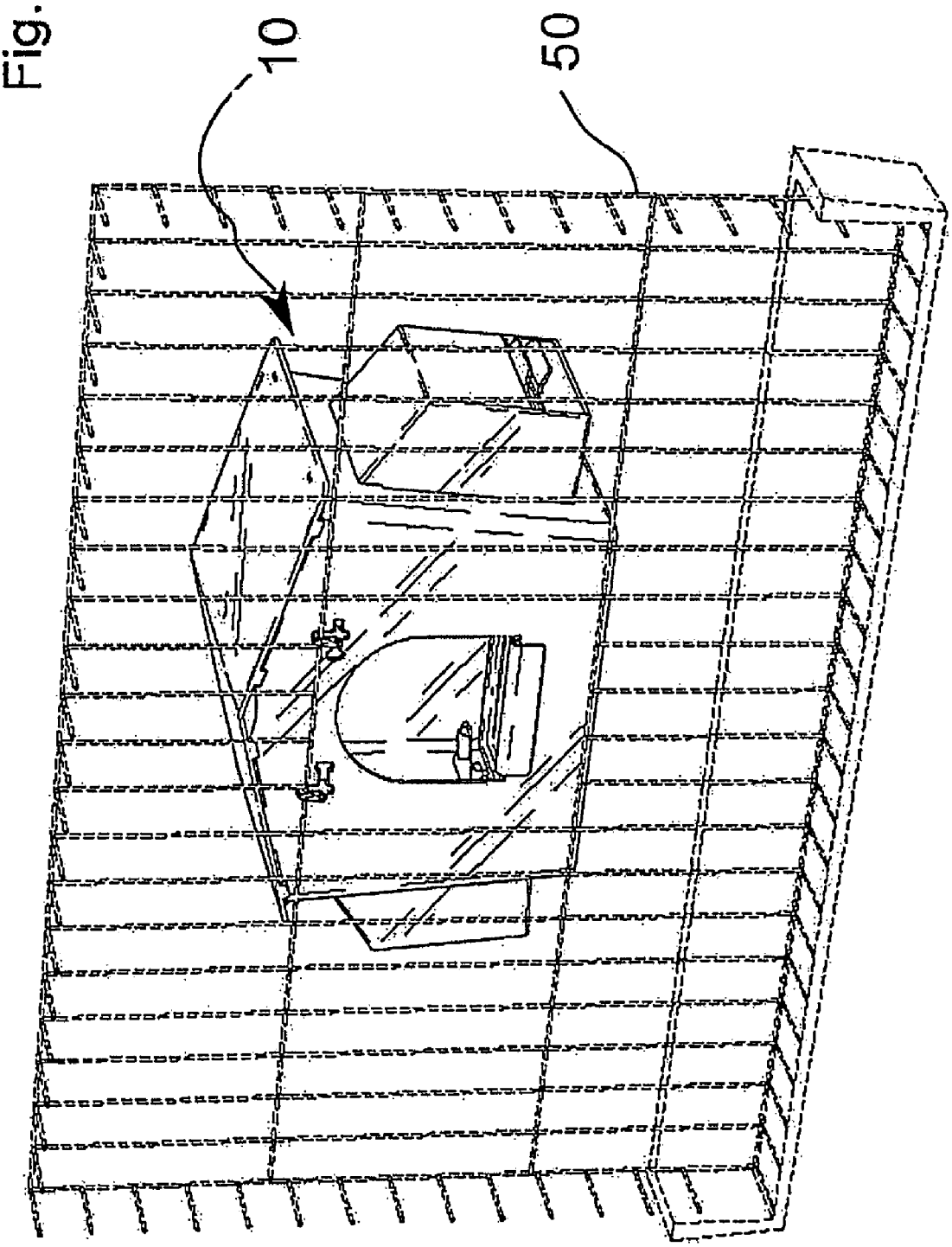

FIG. 10 Perspective view of the removable feeding area favoring the front when hung from a rectangular cage.

FIG. 11 Perspective view of the removable feeding area favoring the back when hung from a round cage.

DETAILED DESCRIPTION OF THE PREFERRED EMBODIMENT

A removable feeding area (10) is comprised of a body (12) having a removable roof (14) and at least one niche (16) but preferably two or more, removably attached, generally on one of a plurality of walls, each niche (16) occupying only one wall. The body (12) is made of a material which is impervious to the passing through of bird feed or similar particles, such as but not limited to synthetic resins, preferably but not necessarily offering a certain degree of transparency or at least transluscent properties. The body (12) has an entrance opening (20) on one of its walls (18), and feeding area hooks (22) to hook the feeding area (10) onto a birdcage (50). The entrance opening (20) can be shut by way of a doorway panel (26) comprised of doorway hooks (7) to hook into the doorway entrance opening (20), a handle (8) to remove or install it, and a grille (9) to maintain proper aeration inside the feeding area (10). The doorway panel (26) is used when removing the feeding area (10) with the bird(s) inside, whether for a trip to the vet or cleaning the inside of the birdcage or any such needs. The feeding area hooks (22) are frictionally and removably inserted into hook grooves (21) situated on a wall (18) of the feeding area (10). Once the feeding area hooks (22) are inserted, the feeding area (10) can be hooked onto a cage (50) using those same feeding area hooks (22).

The roof (14) is removable and made out of two removable panels (24, 24') so that one can fetch birds inside the feeding area (10). Just at the apex, below the roof (14) are vents (17) which can also be used for rotationally lifting a panel (24 or 24'). The panels (24, 24') are frictionally engaging the upper edge of the walls (18) by frictionally engaging means (15). It should be understood that a different feeding area (10) design could have a roof (14) made up of a single panel (24), whether angled or flat, without departing from the scope of the invention.

A removable rounded perch (28) is frictionally and removably inserted at the bottom of the entrance opening (20). The rounded perch (28) has to be removable for two reasons, one being for streamlining the product so that each bevel shaped body (12), can be fitted one within the other for shipping, in which case a perch could be a hindrance, and the other reason being for inserting the doorway panel (26) since the rounded perch (28) needs to be removed for the doorway panel (26) to fit.

A slide-out ridged floor (30) is used for keeping the feet of the birds free of food particles as they gather in between the ridges (31) whereas the feet of the birds are on the top of the ridges (31). To insure that all food particles will fall into the slide-out ridged floor (30) and not be carried inside the cage (50), a perimeter funnel (32) is frictionally engaged to all of the walls (18) and diets the food particles into the slide-out ridged floor (30). This allows the slide-out ridged floor (30) to be loosely engaged into the body (12) so as to slide-out effortlessly once a floor latch (33) is depressed. The slide-out ridged floor (30) rests on the floor (23).

The niche (16) has a drawer (34), sliding partially out by way of sliders (42), and contains a removable feed tray (36). Since the drawer (34) is not fully removable because of a blocker (38), which also serves as a perch, and which is set across from the sliders (42), there is no egress possible for the bird while one replenishes the feed tray (36). The niche (1S) itself is held in place by niche top hooks (40) and a bottom hook (41). The sliders (42) slide into a set of notches (43) configured and sized to allow proper sliding of the sliders (42).

Birds do not feed and relieve themselves in the same location so it is possible to have a feeding area (10) which could be used as a location outside the cage (50) in which birds could relieve themselves. Such a feeding area (10) would be identical except for the fact that water would be put in the drawers (34) since birds tend to relieve themselves around a water source.

The feeding area (10) shown has four wall but other designs could have other geometric shapes having more or fewer than four faces, or even rounded faces which could be better suited to round cages. Also, the feeding area (10) could be put inside the cage this possibility would, besides reducing the interior space of teh cage, have other inconvenients such as making the removal of the feeding area (10) more complex by having to, for example, open the top of the cage, if the design of the cage allows, but doing so could set the birds free. It would also be required to to do so when one wishes to install the doorway panel (26), or replenish the feeding tray, etc . . . This matter of putting the feeding area (10) inside versus outside a cage is discussed here so as to disclose as many obvious variations as possible so that anyone else proposing an inside feeding area (10) would have to provide a radically different invention to overcome obviousness over this disclosure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are Intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A removable feeding area into which small pets can fully enter comprising:
   a body impervious to the passing through of feed or similar particles;
   said body having a removable roof on its top part;
   said body having a plurality of walls;
   at least one niche generally situated on one of a plurality of said walls;
   an entrance opening on one of said walls;
   said body having a ridged floor for keeping the pets feet free of food particles;
   hooks hooking said removable feeding area onto a cage;
   said niche being removably attached to said body;
   said roof having at least one removable panel;
   said ridged floor being able to slide-out;
   a perimeter funnel frictionally engaging said walls for directing food particles into said ridged floor.

2. A removable feeding area as in claim 1 wherein:
   a doorway panel comprised of doorway hooks to hook Into said doorway entrance opening.

* * * * *